United States Patent [19]

Shteinbok et al.

[11] Patent Number: 4,896,818
[45] Date of Patent: Jan. 30, 1990

[54] METHOD OF FABRICATING LIGHT-WEIGHT SECTIONS

[75] Inventors: Lev Z. Shteinbok; Igor L. Shteinbok; Alexandr V. Sagirov; Leonid S. Davydov, all of Moscow, U.S.S.R.

[73] Assignee: Opytnoe Proizvodsyvenno-Tekhnicheskoe Predpriyatie "Energotekhprom", Moscow, U.S.S.R.

[21] Appl. No.: 271,959
[22] PCT Filed: Jan. 7, 1988
[86] PCT No.: PCT/SU88/00003
 § 371 Date: Sep. 21, 1988
 § 102(e) Date: Sep. 21, 1988
[87] PCT Pub. No.: WO88/05350
 PCT Pub. Date: Jul. 28, 1988

[30] Foreign Application Priority Data

Jan. 23, 1987 [SU] U.S.S.R. .............................. 4206339

[51] Int. Cl.⁴ ..................... B23K 20/04; B23K 31/08; B21D 5/06; K04C 3/08
[52] U.S. Cl. .................................. 228/170; 228/171; 228/173.7; 228/265; 29/155 R
[58] Field of Search .................... 228/173.7, 170, 171, 228/182, 265; 29/155 R, 155 C

[56] References Cited

U.S. PATENT DOCUMENTS

3,874,051 4/1975 Malik ................................. 29/155 R

FOREIGN PATENT DOCUMENTS

63835 5/1977 Japan ................................ 228/173.7

Primary Examiner—Richard K. Seidel
Assistant Examiner—Samuel M. Heinrich
Attorney, Agent, or Firm—Fleit, Jacobson, Cohn, Price, Holman & Stern

[57] ABSTRACT

A method of fabricating light-weight sections consisting in uncoiling a strip (20), levelling it, slitting it in a zigzag course into at least two members (5, 6, 7), changing the path of travel of at least one member, matching the members (5, 6, 7) at the edges in the same plane so as to obtain units with an alternating cross-sectional area, and welding units together.

6 Claims, 4 Drawing Sheets

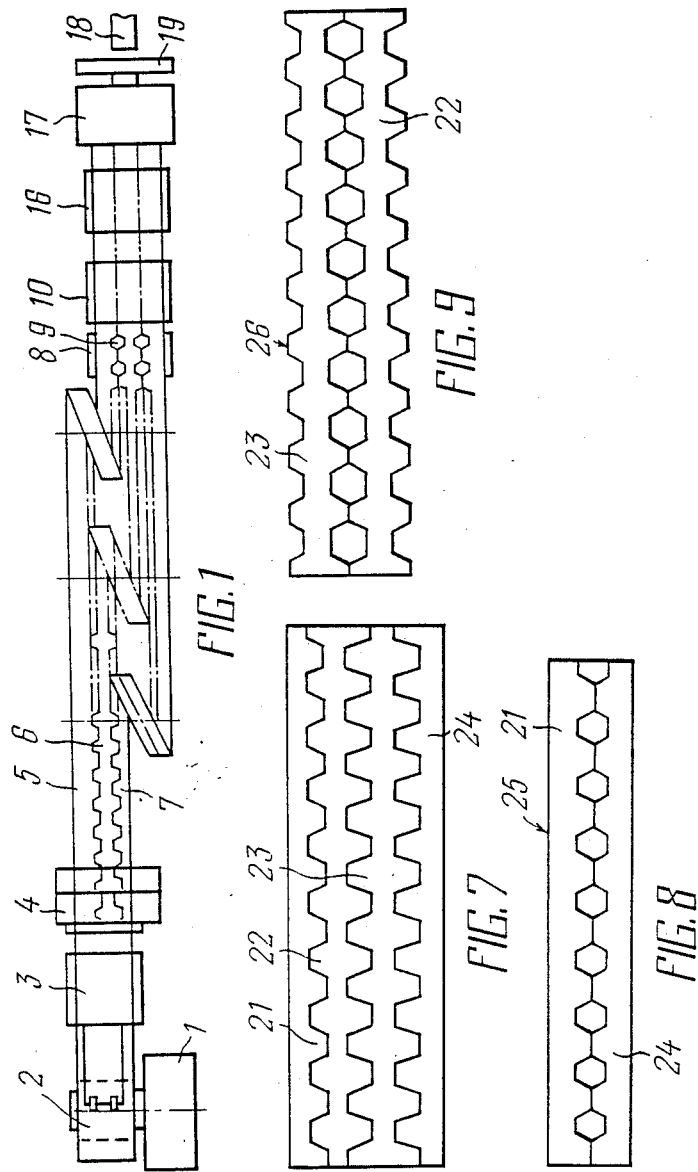

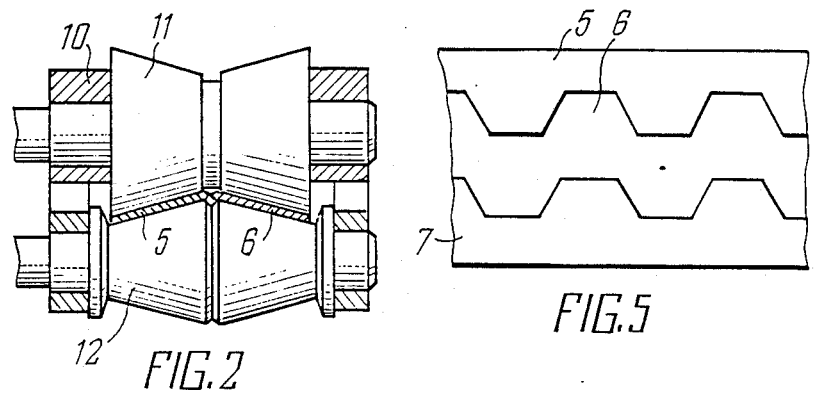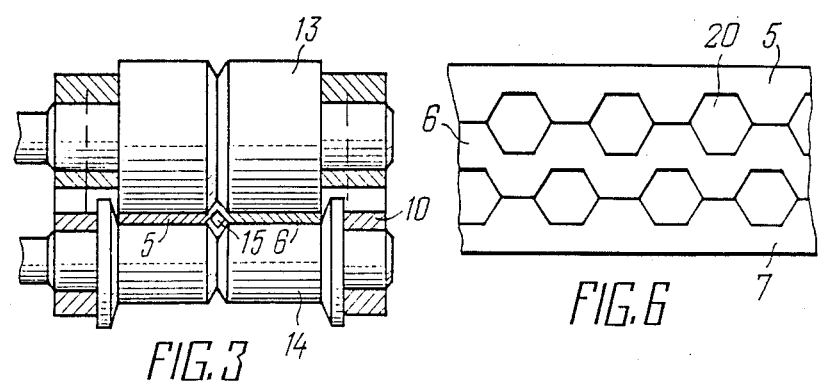

METHOD OF FABRICATING LIGHT-WEIGHT SECTIONS

TECHNICAL FIELD

The present invention relates to metallurgy and has specific reference to methods of fabricating light-weight sections.

The disclosed method can be of particular utility in manufacturing trusses, columns, girders and other structural members for various industrial fields.

PRIOR ART

Widely known is a method of fabricating light-weight sections from rolled stock. Accordingly, a rolled blank, e.g. a channel or I-beam, is slit in a zigzag course into two members which are disengaged and joined at the projections of the zigzag edges, followed by welding to produce a light-weight section. Hot rolled stock lends itself to working by this methods. However, the prior art method of fabricating light-weight sections incurs significant losses of metal. Moreover, since suitable for working in this case are only channels, I-beams and zee beams, the range of light-weight sections fabricated by the prior art method is a limited one.

Also known is a method of fabricating light-weight sections according whereto a strip is uncoiled, levelled, bent into a section, divided into given lengths, slit in a zigzag course into members which are matched to obtain sections with an alternating cross-sectional area and welded together (Yan Brudka et al. "Low-weight Steel Sections", Stroiizdat Publishers, Moscow, 1974, p. 320-325).

This method is applicable to fabricating low-weight sections from bent ones. However, by analogy with the above mentioned prior art method, only a limited range of products can be so produced. Apart from that, to practise low-waste production techniques and render continuous the process of slitting the bent sections in a zigzag course, these sections are welded to each other into a single line. The welding and the preparation of end faces for welding require extra equipment, tools and labour.

Since involved in the zigzag slitting is a wall of a bent section which has been preformed from a strip, internal stresses are set up, causing warping. To avoid this until the members are fully joined at the projections of their zigzag edges, metal intensive equipment (live-roll tables, satellite outfit) is required.

A wall of a bent section can be slit only along a single zigzag line. Therefore, a limitation on the height of light-weight sections is imposed.

To join the slit members of bent sections at the projections of their zigzag edges, the recourse is either to arc welding or $CO_2$-shielded semi-automatic welding which need extra materials (electrodes, welding wire, carbon dioxide). Numerous items of welding equipment are required in order to enable a production line materializing the prior art method to operate at a specified rate of output.

If pressure welding is employed, involving a heating up of the zigzag edges followed by forcing out the oxides in the form of flash, the height of the wall of light-weight section diminishes. Residual stresses existing in members of bent sections and welding deformation, lack of ready-made sized low-weight sections lead to distortion of geometrical shape and poor quality of product.

SUMMARY OF THE INVENTION

The principal object of the present invention is to provide a method of fabricating light-weight sections according whereto all the operations are sequenced and carried out so as to adapt the process to streamlined manufacture, render it a low-waste one, continuous and fully automated, capable of turning out a wide range of quality products.

This object is realized by disclosing a method of fabricating light-weight sections consisting in uncoiling a strip, levelling it and bending into a section, dividing this into given lengths, slitting the lengths in a zigzag course so as to obtain members, matching the members so as to obtain a section with an alternating cross-sectional area and welding the members together, whereby according to the invention preparatory to bending the strip it is slit in a zigzag course into at least two members, the path of travel of at least one thereof is changed, the members so produced are matched at the edges in the same plane so as to obtain at least one unit with an alternating cross-sectional area and these units are welded together.

It is expedient to change the path of travel of at least one member by spiralling same.

As a result, the members slit in a zigzag course can be disengaged from each other during a continuous process and matched at the edges in various ways so as to obtain a unit with an alternating cross-sectional area.

To obtain a unit with an alternating cross-sectional area which has holes, the members must be matched at the projections of zigzag edges.

To obtain a unit with an alternating cross-sectional area but without holes, the members must be matched at the rectilinear edges.

To raise the productivity of the process, save the materials required for welding and carry out the welding in the course of continuous travel of the strip, it is also expedient to use the technique of pressure welding.

To effect the pressure welding, the contiguous members are twisted longitudinally in opposite directions before being placed into the same plane relative to each other.

This creates favorable conditions for the members to approach each other at an angle facilitating their joining at the edges by the pressure welding. Also a shrinkage of the material during the welding of a unit with an alternating cross-sectional area located with reference to its outside edges is so compensated, and warpage of these edges is minimized.

To obtain a unit with an alternating cross-sectional area the holes whereof form a checked pattern, the zigzag edges of a midmost member must be located symmetrically relative to each other in slitting the strip in the zigzag course into three members. Apart from that, a symmetrical angle bar with zigzag edges can be formed from the mid-most member.

To obtain a unit with an alternating cross-sectional area the holes whereof form a checkered pattern, the zigzag edges of a midmost member must be located congruently relative to each other in slitting the strip in the zigzag course into three members.

To facilitate the forming of a section in rolls, the welds must be conditioned when more than two members have been welded together into a unit with an alternating cross-sectional area.

To produce light-weight sections of two different types at a time from a strip slit in a zigzag course into four members, it is preferred to weld the members together pairwise so as to form units with alternating cross-sectional areas having rectilinear and zigzag edges, respectively, which are coiled.

BRIEF DESCRIPTION OF THE DRAWINGS

A preferred embodiment of the method of fabricating light-weight sections will be now described by way of example with reference to the accompanying drawings, wherein FIG. 1 is a schematic representation of a line for the fabrication of light-weight sections from coiled strip;

FIG. 2 is a fragmentary view of welding installation;

FIG. 3 is a view similar to that of FIG. 2;

FIG. 5 is a fragmentary view of a strip slit in a zigzag course into three members the midmost whereof has congruently shaped edges;

FIG. 6 is a fragmentary view of a unit with an alternating cross-sectional area having a checkered pattern of holes;

FIG. 7 is a fragmentary view of a strip slit in a zigzag course into four members;

FIG. 8 is a fragmentary view of a unit with an alternating cross-sectional area having rectilinear edges;

FIG. 9 is a view similar to that of FIG. 8 with zigzag edges;

BEST MODE OF CARRYING OUT THE INVENTION

Figure 10:
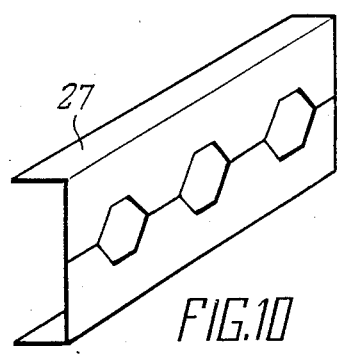
FIGS. 4, 10, 11, 13 through 20 illustrate products fabricated by the disclosed method.

The disclosed method of fabricating light-weight section consists in uncoiling a strip, levelling it, slitting the strip in a zigzag course in at least two members and spiralling at least one of the members so as to change the path of its travel. In a continuous process, the spiralling motion disengages the members slit in the zigzag course and provides for matching their edges in the same plane so as to form at least one unit with an alternating cross-sectional area. The matched members are welded together, and the unit with the alternating cross-sectional area so obtained is bent into a light-weight section. The section is cut into given lengths.

To fabricate a bent light-weight section with holes, use is made of a perforated unit with an alternating cross-sectional area produced by matching the projections of the zigzag edges.

To fabricate a bent light-weight section without holes, the members are matched into a unit with an alternating cross-sectional area at the rectilinear edges.

To raise the productivity of the process and save welding materials, use is made of pressure welding. For welding together, the contiguous members are twisted longitudinally in opposite directions and placed then into the same plane relative to each other. This creates favorable conditions for the members to approach one another at an angle facilitating their joining at the edges by the pressure welding. Apart from that, the longitudinal twisting of the members in opposite directions provides for accommodating a shrinkage of the material during the welding of the unit with the alternating cross-sectional area located with reference to the outsise edges and minimizes warpage of the edges.

If it is specified to produce a unit with an alternating cross-sectional area the holes whereof form a checked pattern, the strip is slit in a zigzag course e.g. into three members, whereby the zigzag edges of the midmost member are located symmetrically relative to each other.

If said edges are located congruently relative to one another, the unit with an alternating cross-sectional area will show holes arranged in a checkered pattern.

If it is specified to produce two units with an alternating cross-sectional area at a time, the strip is slit in a zigzag course into e.g. four members. The members are welded together pairwise to form units with alternating cross-sectional areas having rectilinear and zigzag edges, respectively. The units so produced are coiled and forwarded for bending.

The present method of fabricating light-weight sections is effected on a known equipment operating automatically.

A coil of strip 2 (FIG. 1) is fitted on an uncoiler 1 and the strip is fed into a leveller 3 for levelling and hence is introduced into a slitting means 4 which slits it in a zigzag course e.g. into three members 5, 6, 7, whereby the zigzag edges of the member 6 are located symmetrically relative to each.

The members 5, 6, 7 are each spiralled so as to change the path of their travel and become disengaged from one another and are then placed in a zone 8 in the same plane so as to match each other with the projections of their zigzag edges and form holes 9 before being welded together on a welding installation 10.

For pressure welding which is the technique used, the contiguous members 5, 6 are twisted longitudinally in opposite directions. The edges to be welded together are heated to a plastic stage and pushed together in rolls 11, 12 (FIG. 2) of the welding installation. Rolls 13, 14 (FIG. 3) place the members 5, 6 into the same plane relative to one another and reduce their outside edges at the same time, also forcing out the metal oxides in the form of flash 15 until a weld is formed. A unit with an alternating cross-sectional area which incorporates the member 7 is fabricated in the same way (FIG. 1).

The welds resulting from welding together the members 5 through 7 are conditioned in a means 16, using, e.g., cutting tools.

A bent section, e.g. a channel 18 (FIG. 4), with an alternating cross-sectional area emerging from bending rolls 17 (FIG. 1) is cut on a means 19 into specified lengths by any known technique, e.g. by using a rotary saw (not shown).

The zigzag edges of the member 6 (FIG. 5) can be located congruently relative to each other. In this case, a light-weight section with holes 20 (FIG. 6) forming a checkered pattern is fabricated by the disclosed method.

Figure 11:
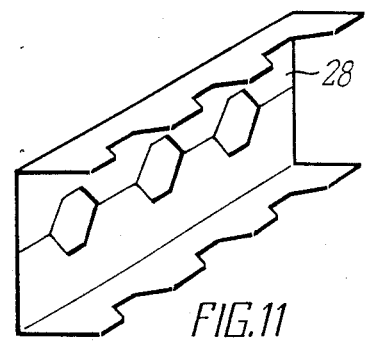
Figure 4:
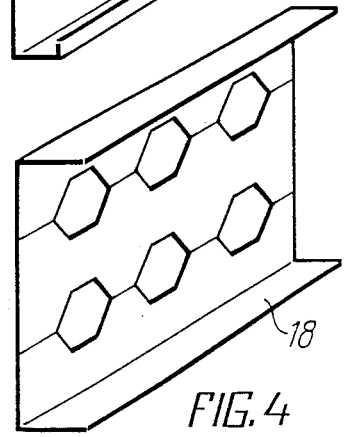
Figure 12:
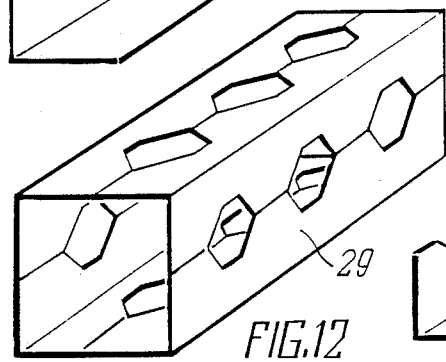
FIG. 12 illustrates a welded structural member.

To produce two units with alternating cross-sectional areas at a time, the strip is slit in the means 4 (FIG. 1) in zigzag courses into four members 21 through 24 (FIG. 4). The members 21, 24 are welded together in the means 10 (FIG. 1) to form a unit 25 (FIG. 8) with an alternating cross-sectional area and rectilinear edges, and the members 22, 23 are welded together to form a unit 26 (FIG. 9) with an alternating cross-sectional area and zigzag edges. The unit 25 (FIG. 8) is bent in accordance with the disclosed method into a light-weight channel 27 (FIG. 10) with an alternating cross-sectional area and rectilinear edges, and the unit 26 (FIG. 9) is also bent in a light-weight channel 28 (FIG. 11) with zigzag edges. The channel 28 can be used as a constituent part of a large welded structural member, e.g. a box section 29 (FIG. 12).

Figure 14:
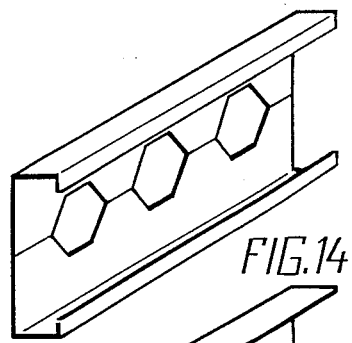
Figure 19:
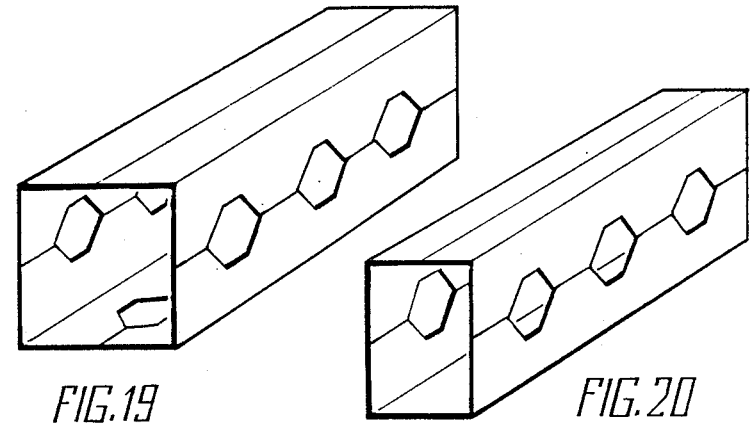
Figure 20:
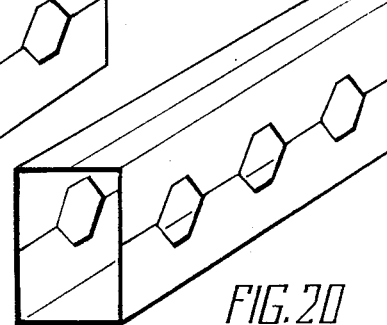
Figure 15:
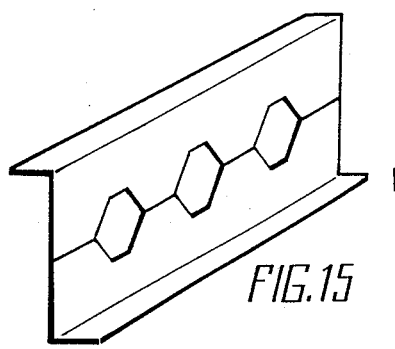
Figure 16:
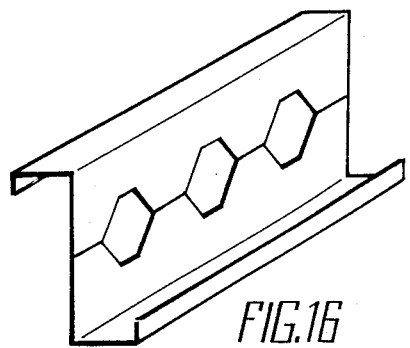
Figure 13:
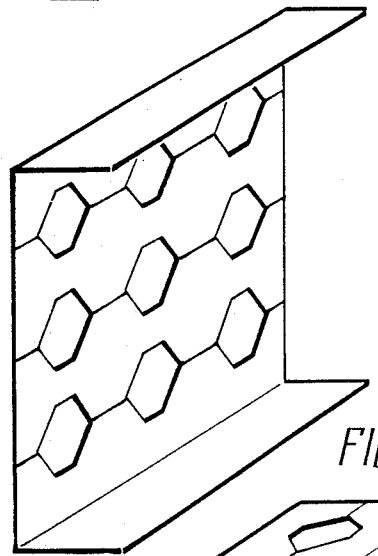
Figure 17:
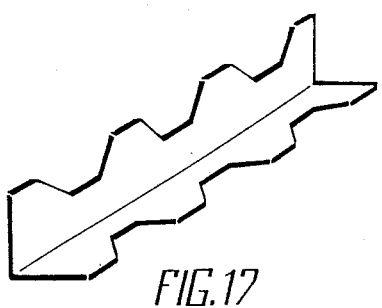
Figure 18:
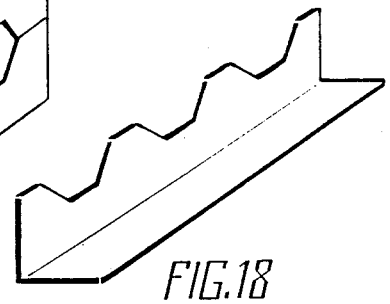

The disclosed method of fabricating light-weight sections materialized in accordance with the invention provides for complete automation of the process, renders this continuous and wasteless. It also adds to the quality of light-weight sections fabricated from units with alternating cross-sectional areas and expands the range of products, making it possible to produce channels (FIG. 13), flanged channels (FIG. 14), Z-bars (FIGS. 15, 16), angle bars (FIGS. 17, 18), square box sections (FIGS. 14, 19), rectangular box sections (FIG. 20) and the like.

INDUSTRIAL APPLICABILITY

The disclosed method can be used to advantage in manufacturing trusses, columns, girders and other structural members meeting the needs of various industrial fields.

We claim:

1. A method of fabricating a metal sheet material unit from an elongate metal strip having a longitudinal axis which comprises dividing the strip longitudinally into at least two narrower strips having adjacent zigzag edges, relatively displacing the narrower strips lengthwise and widthwise relative to one another by winding at least one of the narrower strips spirally into a helix having an axis perpendicular to the longitudinal axis, reengaging the zigzag edges of the narrower strips in a longitudinally displaced position and welding the narrower strips together with the zigzag edges in engagement.

2. A method as claimed in claim 1 wherein after welding, the material is bent lengthwise into a three dimensional unit.

3. A method as defined in claim 1 wherein the zigzag edges each have a respective tooth-like configuration with rectilinear outer sections which are aligned lengthwise when the narrower edges are reengaged to form apertures therebetween.

4. A method as defined in claim 1 wherein the welding is effected by plastic deformation.

5. A method as defined in claim 1 wherein the strip is divided longitudinally into a central strip and outer strips and wherein opposite zigzag edges of the central strip are disposed symmetrically relative to said longitudinal axis.

6. A method as defined in claim 1 wherein the strip is divided into at least four narrower strips, two of the narrower strips are welded to form a unit with rectilinear outer edges and another two of the narrower strips are welded to form a unit with zigzag outer edges.

* * * * *